Sept. 29, 1964   G. E. FLINN   3,150,541
REAR MOUNTED TRANSMISSION
Original Filed March 27, 1958
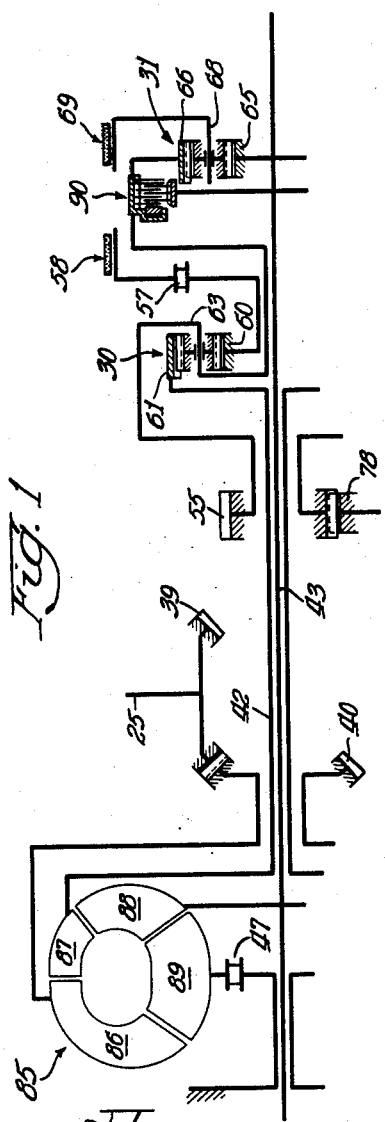
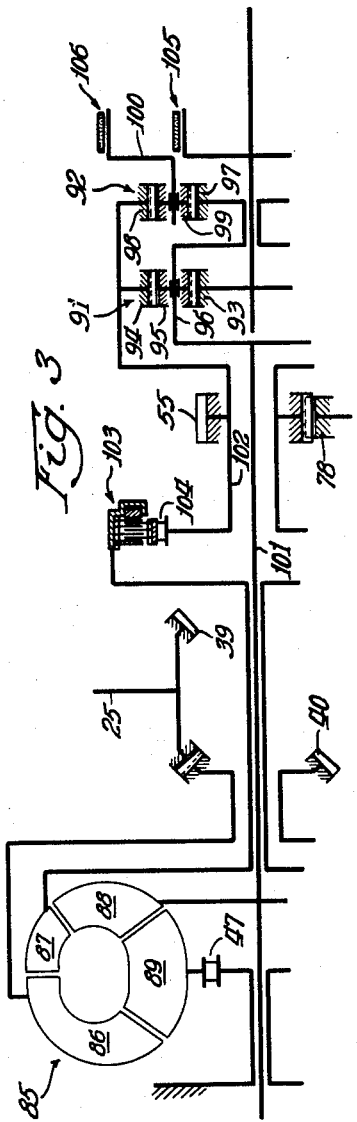
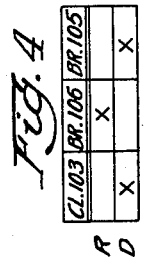
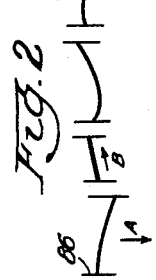
Inventor:
George E. Flinn
By: Ray E. Snyder Atty.

United States Patent Office 3,150,541
Patented Sept. 29, 1964

3,150,541
REAR MOUNTED TRANSMISSION
George E. Flinn, Muncie, Ind., assignor to Borg-Warner Corporation, Chicago, Ill., a corporation of Illinois
Original application Mar. 27, 1958, Ser. No. 724,399, now Patent No. 3,051,017, dated Apr. 28, 1962. Divided and this application Nov. 16, 1961, Ser. No. 152,763
5 Claims. (Cl. 74—677)

My invention relates to transmissions particularly for motor vehicles. More specifically, the invention relates to transmissions of the torque converter type which are suitable for mounting in the rear of a vehicle transversely of the vehicle.

This application is a division of my co-pending application Serial No. 724,399, filed March 27, 1958, now Patent No. 3,051,017.

It is an object of the present invention to provide a transmission type utilizing two planetary gear sets, an element of one of which is braked for providing a forward drive and an element of the other of which is braked for providing a reverse drive. It is also an object to provide in such a transmission a torque converter that has at least two driven elements, with the driven elements successively being effective for increasing the speed ratio in forward drive to the output member of the transmission.

It is also an object of the invention to provide a transmission of this general type which initially begins the forward drive at a one to one ratio from one driven element of the torque converter in the transmission and with a second element of the torque converter being effective to drive through overdrive gearing for subsequently driving the output member of the transmission at an overdrive speed ratio.

The invention consists of the novel constructions, arrangements and devices to be hereinafter described and claimed for carrying out the above-stated objects and such other objects as will be apparent from the following description of preferred forms of the invention, illustrated with reference to the accompanying drawings, wherein:

FIGURE 1 is a diagrammatic illustration of a transmission embodying the principles of the invention;

FIGURE 2 is a diagram showing the curvatures of the various blades of the hydraulic torque converter which is a part of the FIGURE 1 transmission;

FIGURE 3 is a line diagram illustrating a modified form of a transmission which may be used in lieu of the transmission illustrated in FIGURE 1; and FIGURE 4 is a table indicating the various brakes and clutches that are engaged for obtaining various power transmitting conditions in the FIGURE 3 transmission embodiment.

Like characters of the reference designate like parts in the several views.

Referring now to FIGURE 1, the variable-speed transmission illustrated therein comprises a hydraulic torque converter 85 and planet gear sets 30 and 31.

The hydraulic torque converter 85 has a fluid impeller 86, first and second turbine elements 87 and 88, and a reactor 89. All of the elements 86, 87, 88, and 89 are bladed, and the blades have the curvature at their mean flow lines as shown in FIGURE 2. The reactor 89 is braked from reverse rotation by means of a one-way brake 47. The impeller 86 is driven by the propeller shaft 25 through gears 39 and 40.

The planet gear set 30 comprises a sun gear 60, a ring gear 61, and a planetary gear carrier 63 having planet gears thereon meshing with the gears 60 and 61. The planet gear set 31 comprises a sun gear 65, a ring gear 66, and a planetary gear carrier 68 having planetary gears thereon meshing with the gears 65 and 66. The planetary gear carrier 63 of the planetary gear set 30 and the ring gear 66 of the planetary gear set 31 are connected to the output gear 55 of the transmission which drives the gear 78. The friction brake 58 and one-way brake 57 are provided for the sun gear 60, and the brake 69 is provided for the carrier 68. A friction clutch 90 is provided which connects the sun gear 65 and the ring gear 66 and serves to lock up the rear gear set 31 in a 1:1 drive ratio when engaged. The ring gear 61 is connected to shaft 42 which is connected to the first turbine element 87 of the hydraulic torque converter 85. The sun gear 65 is connected to the shaft 43 which is in turn connected to the second turbine element 88.

In operation, forward drive range is provided by engaging the brake 58 and the clutch 90. The clutch 90 locks up the elements of the gear set 31, and the brake 58 acting through the one-way brake 57 holds the sun gear 60 causing it to act as a reaction element for the gear set 30. Initially, torque is impressed on the turbine 87 in the forward direction; at this time, there is reaction in the reverse direction on the reactor 89, and the one-way brake 47 holds the reactor against reverse rotation so that the torque converter 85 multiplies torque. Turbine 87 drives the ring gear 61 of the planetary gear set 30 through shaft 42 in the forward direction; and since the sun gear 60 is held against rotation by the brake 58 and one-way brake 57, the planetary gear carrier 63, connected to gear 55, is driven in a forward direction at a reduced ratio. Initially, there is not sufficient torque in the forward direction on the turbine 88 to cause it to function but subsequently the torque on the element 88 increases sufficiently so that it drives through the locked up rear gear set 31 to the carrier 63 and thereby directly to output gear 55. At this time, the one-way brake 57 overruns, and the turbine 87 is of no driving effect. As is usual with such hydraulic torque converters, eventually in the higher speeds, the force of reactor 89 changes from reverse to forward, and the reactor at this times moves in the forward direction with its brake 47 overrunning so that the torque converter 85 is now in its coupling range.

For reverse drive, the brake 69 is engaged. The turbine 88 drives the sun gear 65 in the forward direction; and since the carrier 68 is held stationary by brake 69, the ring gear 66, and thereby the output gear 55, is driven in the reverse direction.

The embodiment of the invention illustrated in FIGURE 3 utilizes the same hydraulic torque converter 85 as in the FIGURE 1 embodiment. In this case, the hydraulic torque converter is also driven through the gears 39 and 40, and the stator 89 is held from reverse rotation due to the action of the one-way brake 47.

The embodiment illustrated in FIGURE 3 comprises two planet gear sets 91 and 92. The gear set 91 comprises a sun gear 93, a ring gear 94, planet gears 95 in mesh with the sun and ring gears and a planet gear carrier 96. The gear set 92 comprises a sun gear 97, a ring gear 98, planet gears 99 in mesh with the sun and ring gears and a planet gear carrier 100. The two ring gears 94, and 98 are connected together, and the sun gear 97 and gear carrier 96 are connected together.

The turbine 88 is connected by means of a shaft 101 with the carrier 96 and the sun gear 97, and the ring gears 94 and 98 are connected to the turbine 87 by means of a shaft 102 in which a friction clutch 103 and a one-way clutch 104 are disposed. A friction brake 105 is provided for the sun gear 93, and a friction brake 106 is provided for the carrier 100. The output gear 55 is fixed with respect to the shaft 102.

In operation, the clutch 103 and the brake 105 are engaged for completing the forward drive. The turbine 87 initiates the forward drive, driving the output gear 55 directly through the friction clutch 103 and the one-way engaging device 104. The stator 89 functions as in the previously described embodiment to cause the unit 85 to multiply torque until the hydraulic unit 85 eventually goes into its coupling range.

As the speed of the parts increases, the turbine 88 becomes effective to transmit the drive, driving the carrier 96 through the shaft 101. The brake 105 holds the sun gear 93 stationary so that the sun gear constitutes the reaction element of the gear set 91, and the ring gear 94 and the output gear 55 are driven at an overdrive with respect to the shaft 101 and the turbine 88. At this time, the one-way engaging device 104 releases, and the turbine 87 idles or runs freely.

Reverse drive is completed by engaging the brake 106 which functions to hold the carrier 100 stationary. The turbine 88, under these conditions, drives the sun gear 97 through the shaft 101 and carrier 96. Due to the fact that the carrier 100 is stationary, the ring gear 98 is driven reversely at increased torque with respect to the torque applied on the shaft 101, and the gear 55 is driven along with the gear 98, being connected thereto.

My improved transmissions advantageously provide gradually increasing speed ratios from the transmission input member to the transmission output member. The torque converters inherently provide such gradually increasing ratios, and the plurality of turbine elements successively drive in connection with the gearing to increase the range in which torque conversion exists in the torque converter as the vehicle speed increases. Each of the transmissions has a separate gear set for providing reverse drive, and the reverse torque on one of the torque converter elements need not be depended on for driving the vehicle reversely. The first embodiment advantageously provides an underdrive speed ratio in the gearing connected with the torque converter while the third embodiment advantageously provides an overdrive speed ratio in the gearing.

I wish it to be understood that the invention is not to be limited to the specific constructions and arrangements shown and described, except only insofar as the claims may be so limited, as it will be apparent to those skilled in the art that changes may be made without departing from the principles of the invention.

I claim:

1. In a transmission, the combination of an input member, an output member, a hydraulic torque converter having an impeller or driving element driven by said input member, and a pair of turbine or driven elements, and a stator element, a one-way brake for holding said stator element from reverse rotation, first and second planet gear sets, said input member and said output member being located between said hydraulic torque converter and said gear sets, each of said gear sets comprising a sun gear element and a ring gear element and a planet gear in mesh with said sun and ring gear elements and a planet gear carrier element, a friction clutch for operatively connecting one of said turbine elements to said output member to provide a forward drive ratio from said one turbine to said output member, the other of said turbine elements being connected to at least one element of said planetary gear sets, means for braking an element of said first gear set to provide another forward drive ratio through the gear set to said output member from said other turbine element, and means for braking another of said elements of said second gear set so as to provide a reverse drive from one of said turbine elements through said second gear set to said output member.

2. In a transmission, the combination of an input member, an output member, a hydraulic torque converter having an impeller or driving element driven from said input member and first and second turbine or driven elements and a stator or reaction element, first and second planet gear sets each comprising a sun gear and a ring gear and a planet gear in mesh with said sun and ring gears and a planet gear carrier, said ring gear of said second gear set and said carrier of said first gear set being connected with said output member, said input and output members being located between said hydraulic torque converter and said planet gear sets, means for connecting said first turbine element with said ring gear of said first gear set, a friction brake connected through a one-way brake to said sun gear of said first gear set for providing a low speed forward drive from said first turbine element through said first gear set to said output member, a friction clutch for connecting said sun gear and said ring gear of said second gear set together for locking up the elements of the gear set, means for connecting said second turbine element to said sun gear of said second gear set for providing a direct drive from said second turbine element to said output member when said clutch is engaged, and a friction brake for said carrier of said second set for providing a reverse drive through said second set from said second turbine element to said output member.

3. In a transmission, the combination of an input member, an output member, a hydrodynamic coupling device having an impeller or driving element driven by said input member and first and second turbine or driven elements, first and second planet gear sets each having an element connected with said output member, said input and output members being located between said hydraulic torque converter and said plant gear sets, a clutch for connecting said first turbine element with said output member for providing a direct drive from the turbine element to the output member, means for connecting said second turbine element to a second element of each of said gear sets, a brake for a third element of said first gear set for providing a change speed forward drive to said output member, through the gear set from said second turbine element and a brake for a third element of said second gear set for providing a reverse drive through said second gear set from said second turbine element to said output member.

4. In a transmission, the combination of an input member, an output member, a hydrodynamic coupling device having an impeller or driving element driven by said input member and first and second turbine or driven elements, first and second planet gear sets each of which has a first element thereof connected to said output member, said input and output members being located between said hydraulic torque converter and said planet gear sets, a clutch for connecting said first turbine element with said output member, a one-way clutch between said first named clutch and said output member, means for connecting said second turbine element with a second element of both of said gear sets, a brake for a third element of said first gear set for providing an overdrive power train through the gear set to said output member so that said one-way clutch overruns, and a brake for a third element of said second gear set for providing a reverse drive through the gear set to said output member.

5. In a transmission, the combination of an input member, an output member, a hydraulic torque converter having an impeller or driving element driven by said input member and first and second turbine or driven elements and a stator or reaction element respectively disposed in a toroidal fluid circuit, a one-way brake for preventing reverse rotation of said stator, a friction clutch for connecting said first turbine element with said output member for providing a direct drive power train between said first turbine element and said output member, a one-way clutch between said friction clutch and said output member and in said direct drive power train, first and second planet gear sets each comprising a sun gear and a ring gear and a planet gear and a planet gear carrier, said input and output members being located between said hydraulic torque converter and said planet gear sets, said ring gears both being connected with said output member, means for connecting said second turbine element to said carrier of said first set and to said sun gear of said second set, a brake for said sun gear of said first set so that said first set provides an overdrive of said output member with a disengagement of said one-way clutch, and a brake for the carrier of said second set for causing said output member to be driven in the reverse direction from said second turbine element through said second set.

References Cited in the file of this patent

UNITED STATES PATENTS 2,803,974    Kelley _____ Aug. 27, 1957

FOREIGN PATENTS 553,518    Belgium _____ Jan. 15, 1957